F. McINNERNY.
BOLT.
APPLICATION FILED MAR. 7, 1908.
903,397.
Patented Nov. 10, 1908.
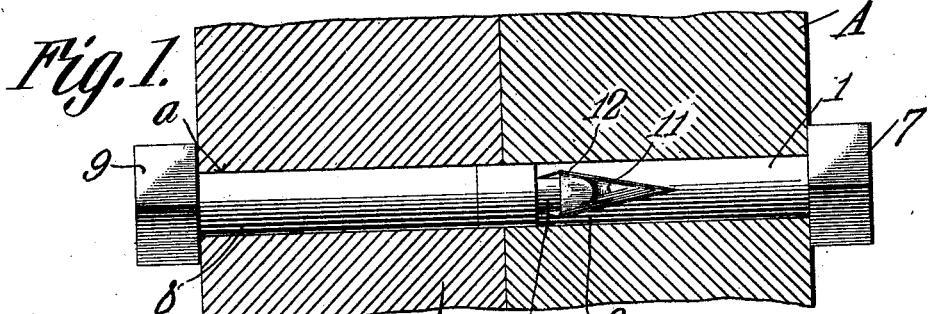
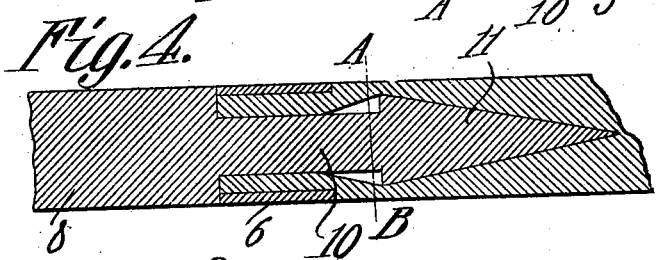
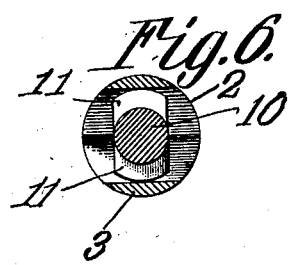
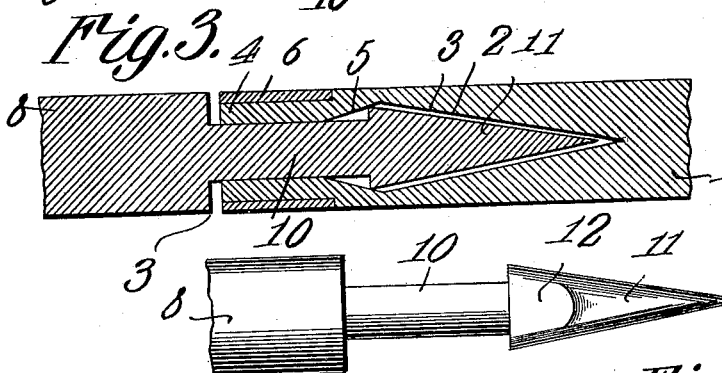
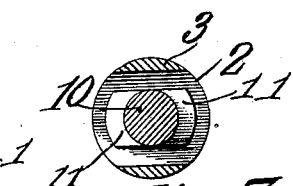
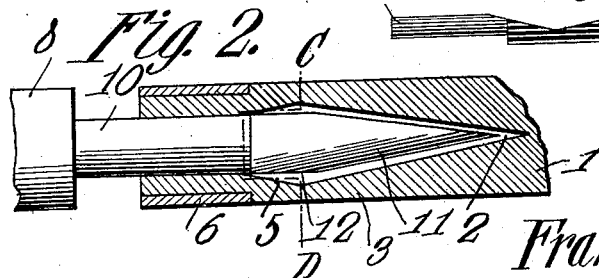
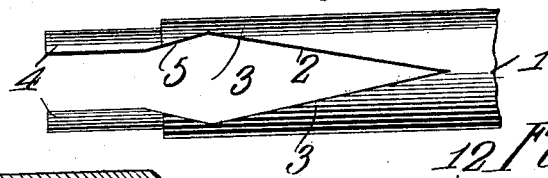
Witnesses
Inventor
Frank McInnerny,
By C. A. Snow & Co
Attorneys

UNITED STATES PATENT OFFICE.

FRANK McINNERNY, OF IOWA CITY, IOWA.

BOLT.

No. 903,397.     Specification of Letters Patent.     Patented Nov. 10, 1908.

Application filed March 7, 1908. Serial No. 419,778.

*To all whom it may concern:*

Be it known that I, FRANK McINNERNY, a citizen of the United States, residing at Iowa City, in the county of Johnson and State of Iowa, have invented a new and useful Bolt, of which the following is a specification.

This invention relates to bolts and its object is to provide a device of this character which dispenses with the use of nuts and threads and which can be utilized to quickly and securely fasten together objects into which the bolt is insertible.

Heretofore considerable time has usually been required in bolting objects together because it is necessary to move the nut a number of rotations before the object in which the bolt is located is sufficiently secured.

The principal object of the invention is to provide a bolt which can operate to tightly engage the bolt holding objects without requiring more than a one-quarter turn of one of the members of the fastener.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is an elevation of a bolt embodying the present improvements and showing the same in position within two objects to be bolted together, the members of the bolt being shown locked together. Fig. 2 is a view partly in section and partly in elevation of the meeting ends of the bolt sections and showing the relative positions of the parts when the male member is first inserted into the female member. Fig. 3 is an enlarged section through the meeting ends of the bolt members and showing the relative positions of the parts when partly locked. Fig. 4 is a view similar to Fig. 3 and showing the positions of the parts when fully locked together. Fig. 5 is a detail view of the female member of the bolt. Fig. 6 is a section on line A—B, Fig. 4. Fig. 7 is a section on line C—D, Fig. 2.
Fig. 8 is a side elevation of the male member. Fig. 9 is a perspective view of said member.

Referring to the figures by characters of reference, 1 designates the female member of the bolt, the same being preferably cylindrical in form and having a V-shaped recess 2 extending into one end thereof and forming oppositely disposed jaws 3. From the small end of each of these jaws extends an arm 4 the inner or adjoining faces of the arms being parallel for the greater portions of their lengths while those ends of said faces which are nearest the apex of the recess 2 diverge in the direction of said apex so as to form inclined faces 5. These arms 4 are designed to be surrounded by a band or ferrule 6 which prevents the arms from spreading apart so that they constitute unyielding retaining devices as will be hereinafter set forth.

The bolt member 1 is provided at that end thereof farthest removed from recess 2 with a head 7 preferably angular in outline so that it can be conveniently gripped by an ordinary wrench. The other or male member of the bolt consists of a cylindrical body 8 having an angular head 9 at one end while its other end has a central longitudinally extending stem 10 provided at its free end with a conical head 11 opposite portions of which are flattened adjacent the large end of said head 11 as shown at 12. The thickness of this flattened portion is equal to or slightly less than the distance between the arms 4 but the greatest thickness of the large end of head 11 is greater than the distance between the arms 4 and is substantially equal to the greatest distance between the jaws 3. The angle of the cone 11 is such that said cone, if inserted between the jaws 3, will contact therewith throughout their lengths as clearly indicated in Fig. 4.

When it is desired to fasten the two bolt sections together they are inserted into opposite ends of the bolt opening *a* in the members A to be fastened together. The parts are brought together with the cone 11 positioned with its faces 5 parallel with the inner or adjoining faces of the arms 4. It will be seen therefore that as the two bolt sections 1 and 8 are pushed together the head 11 will be free to pass between the arms 4 and with its large end arranged between the diverging faces 5 of the arms 4. After the parts have been pushed together in this manner as far as they will go one of the members, preferably the member 8, is given a one-quarter turn. This will cause the flattened end of the head 11 to turn against the diverging or inclined faces 5 and to slide along said faces and thus cause the head 11 to push firmly against the walls of the jaws 3 until the parts are tightly connected as indicated in Fig. 4. It will be apparent therefore that by giving a partial turn to one of the members not only are the two members securely locked against separation but they are also drawn firmly together and thus more securely bind the objects together. To disconnect the parts of the bolt it is merely necessary to reverse the foregoing operation by giving a one-quarter turn to one of the bolt members so that the head 11 will assume a position with its flat faces 5 parallel with the adjoining faces of the arms 4 whereupon the two bolt members can be disengaged. It will be seen that by utilizing a bolt such as shown and described the time ordinarily wasted in screwing or unscrewing a nut upon the bolt is saved without, however, reducing the efficiency of the device as compared with bolts of the ordinary construction.

What is claimed is:

1. A bolt comprising a member having opposed diverging jaws, oppositely disposed arms extending from the jaws, the inner faces of said arms diverging toward the jaws, and a second member having a flattened conical head insertible between the arms and jaws, said head being partly revoluble to frictionally engage and be shifted by the diverging faces of the arms.

2. A bolt comprising a female member having oppositely disposed engaging jaws, arms extending from said jaws and having inner faces diverging toward the jaws, and a male member having a conical head provided with opposed flattened faces, said head when in one position being insertible between the arms and jaws and partly revoluble to coöperate with the diverging faces of the arms to shift the conical head between the jaws.

In testimony that I claim the foregoing as my own, I have hereto affixed my signature in the presence of two witnesses.

FRANK McINNERNY.

Witnesses:
 JOSEPH MILLER,
 W. F. ANDERSON.